United States Patent [19]

Favre

[11] 4,237,012
[45] Dec. 2, 1980

[54] BOOM FOR CONTAINING AND COLLECTING OIL SPILLS ON THE SURFACE OF A BODY OF WATER

[76] Inventor: Ernest Favre, 1725 Ecuvillens, Switzerland

[21] Appl. No.: 940,145

[22] Filed: Sep. 6, 1978

[30] Foreign Application Priority Data

Apr. 24, 1978 [CH] Switzerland .......................... 4363/78

[51] Int. Cl.$^3$ ............................................. F02B 15/04
[52] U.S. Cl. ................................. 210/242 .3; 210/923
[58] Field of Search ................ 210/242 S, 242 R, 169, 210/DIG. 25, DIG. 26

[56] References Cited

U.S. PATENT DOCUMENTS

| 42,073 | 3/1864 | Cannon | 210/242 S |
|---|---|---|---|
| 3,495,561 | 2/1970 | Trapp | 210/242 S |
| 3,726,406 | 4/1973 | Damberger | 210/242 S |
| 3,741,391 | 6/1973 | Donsbach | 210/242 S |
| 3,745,115 | 7/1973 | Olsen | 210/242 S |
| 3,768,656 | 10/1973 | Nugent | 210/242 S |
| 3,776,246 | 11/1973 | Dahan | 210/242 R |
| 4,139,470 | 2/1979 | Stagemeyer et al. | 210/242 S |

FOREIGN PATENT DOCUMENTS 866659  4/1961  United Kingdom ..................... 210/242

*Primary Examiner*—John Adee
*Attorney, Agent, or Firm*—Robert E. Burns; Emmanuel J. Lobato; Bruce L. Adams

[57] ABSTRACT

A boom for containing and collecting oil spilt on the surface of a body of water has a number of pivotally linked tanks which form a continuous length. Each tank is supported in a floating condition in the water with most of its volume immersed. Each tank has an open top, walls and a bottom, and the bottom has holes through which water can pass. Oil which is lifted by wave action over the edges of the tanks will drop into the tanks and displace water through the holes in the bottom. This process will continue until all the water has been displaced by oil, whereupon the tanks are full and can be removed for emptying. The invention relies on the fact that water and oil are immiscible and that water is more dense than oil, so that the oil floats on top.

6 Claims, 11 Drawing Figures

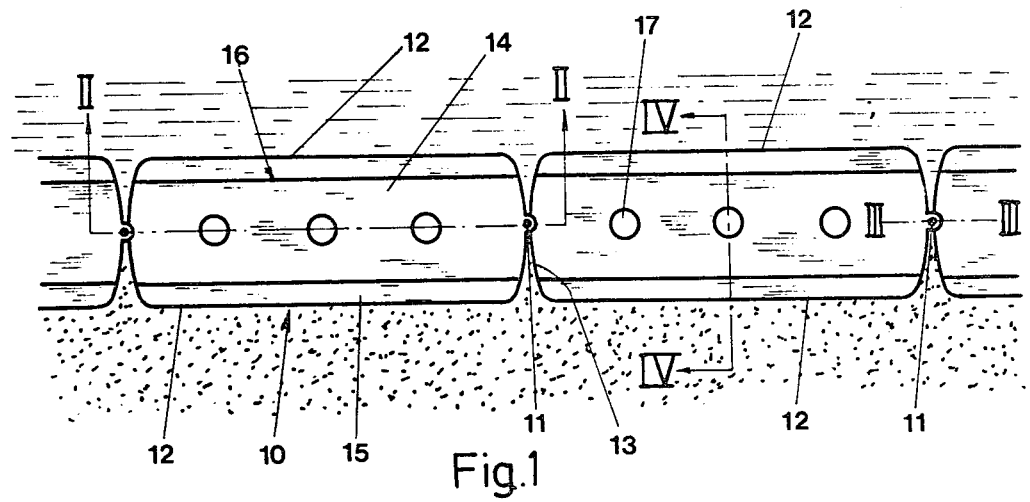
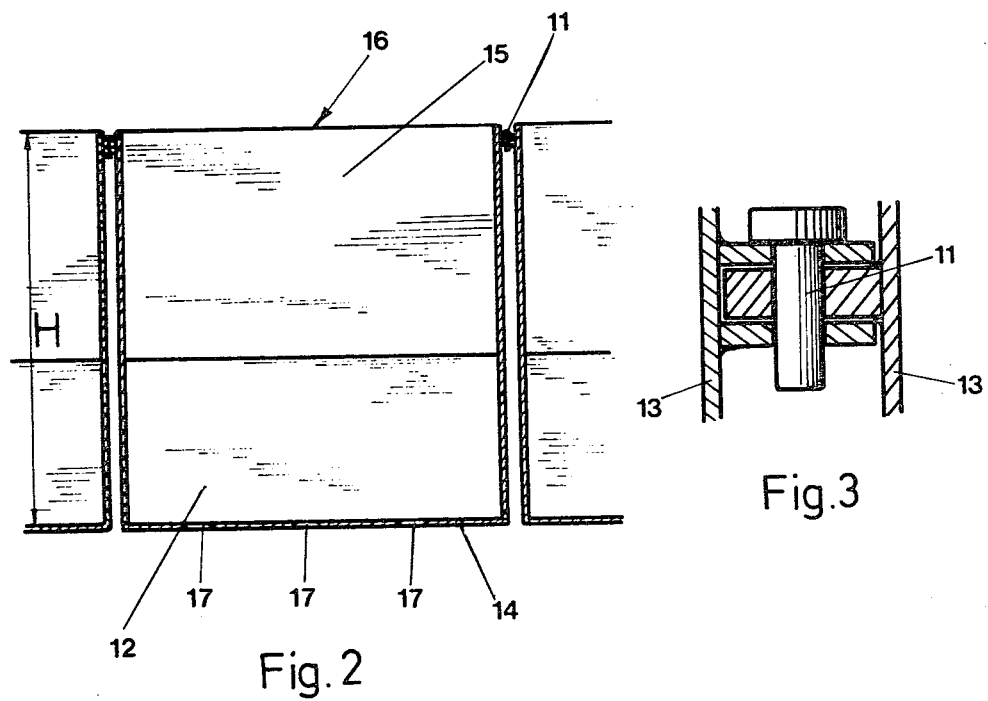

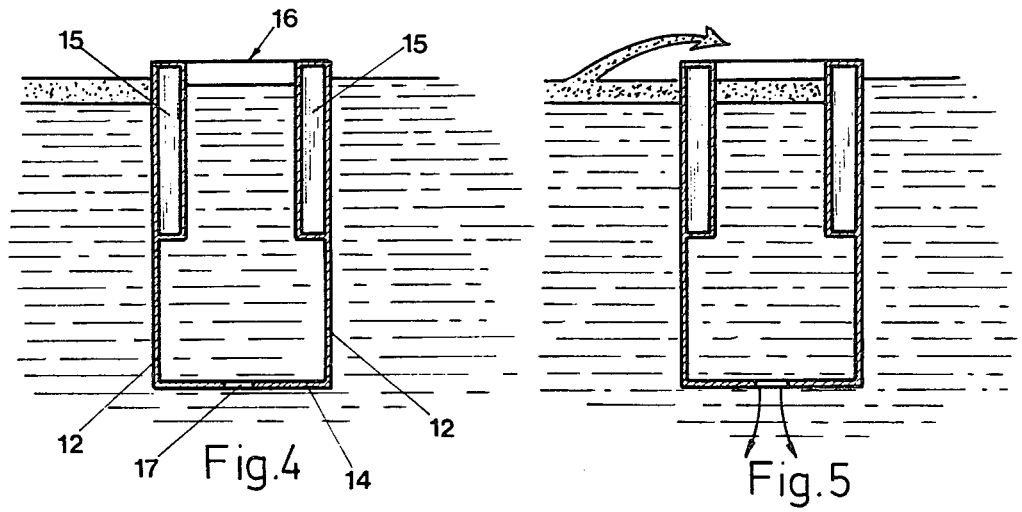
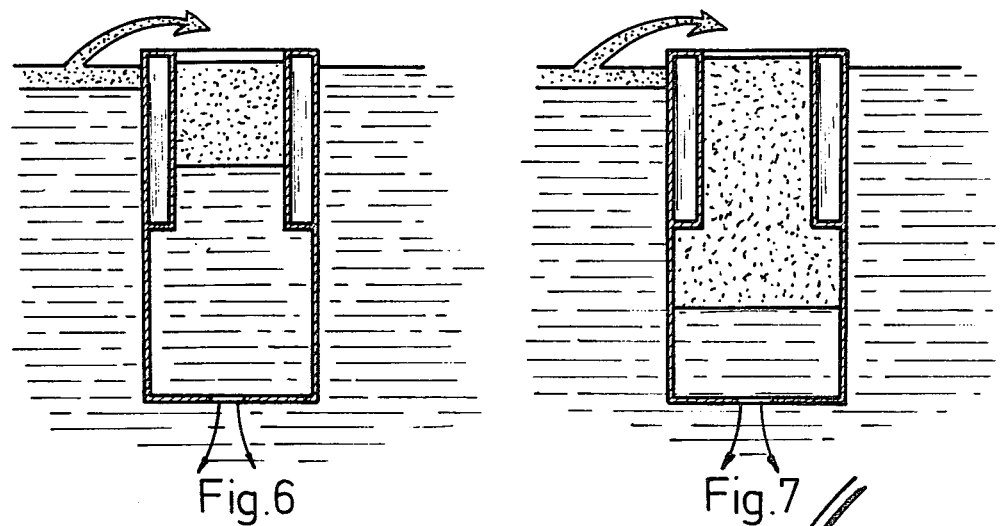
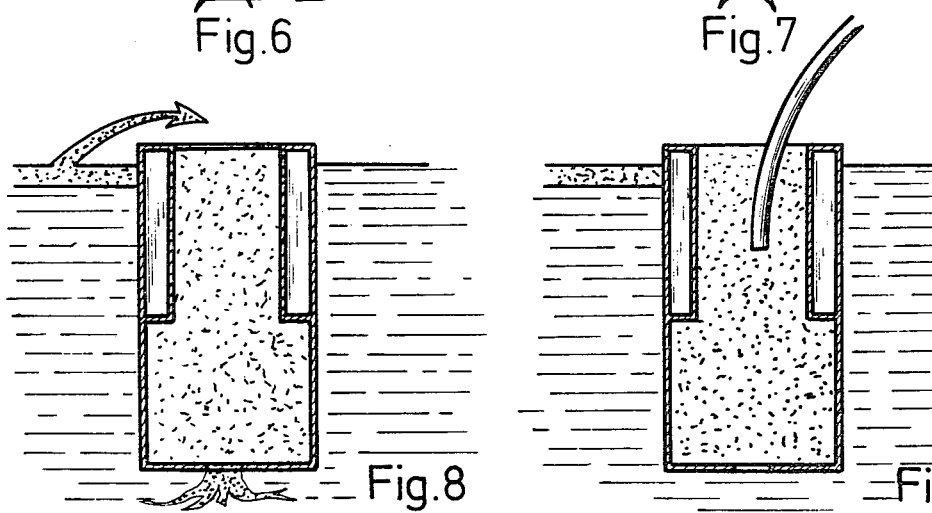

BOOM FOR CONTAINING AND COLLECTING OIL SPILLS ON THE SURFACE OF A BODY OF WATER

FIELD OF THE INVENTION

This invention relates to a boom for collecting hydrocarbons from the surface of a body of water. It is particularly applicable to the collection of oil from the surface of the sea.

BACKGROUND OF THE INVENTION

The disastrous effects of oil spillages at sea are known. Such spillages are particularly unpleasant when they occur close to land, when the oil can be washed onto the shore. Once this occurs, the problems of removing the oil are enormous.

SUMMARY OF THE INVENTION

According to the present invention, there is provided a boom for collecting hydrocarbons, such as oil from the surface of a body of water, the boom comprising a plurality of pivotally linked tanks, each tank having walls and a bottom defining a hydrocarbon receiving cavity open at the top, at least one hole in the bottom through which water can enter and leave the cavity, and means for supporting the tank in a partially immersed, upright condition in the body of water.

This invention provides a protection against pollution which is simple to put into place, which can contain an oil slick on the water surface and which operates without the use of any mechanical means such as pumps, suction devices etc. simply using the effect of the sea swell for loading the oil or other hydrocarbons into the tanks.

Further features and advantages of the present invention will become apparent from the following description which is to be read in conjunction with the accompanying drawings.

BRIEF DESCRIPTION OF THE DRAWINGS

FIG. 1 is a plan view of a boom according to the invention;

FIG. 2 is a cross-sectional view on the lines II—II in FIG. 1;

FIG. 3 is a detailed view of the pivot between two tanks, on the line III—III from FIG. 1;

FIGS. 4 to 9 are views on the section line IV—IV in FIG. 1 showing sequential stages in the operation of the device;

DETAILED DESCRIPTION OF THE PREFERRED EMBODIMENT

Figure 10:
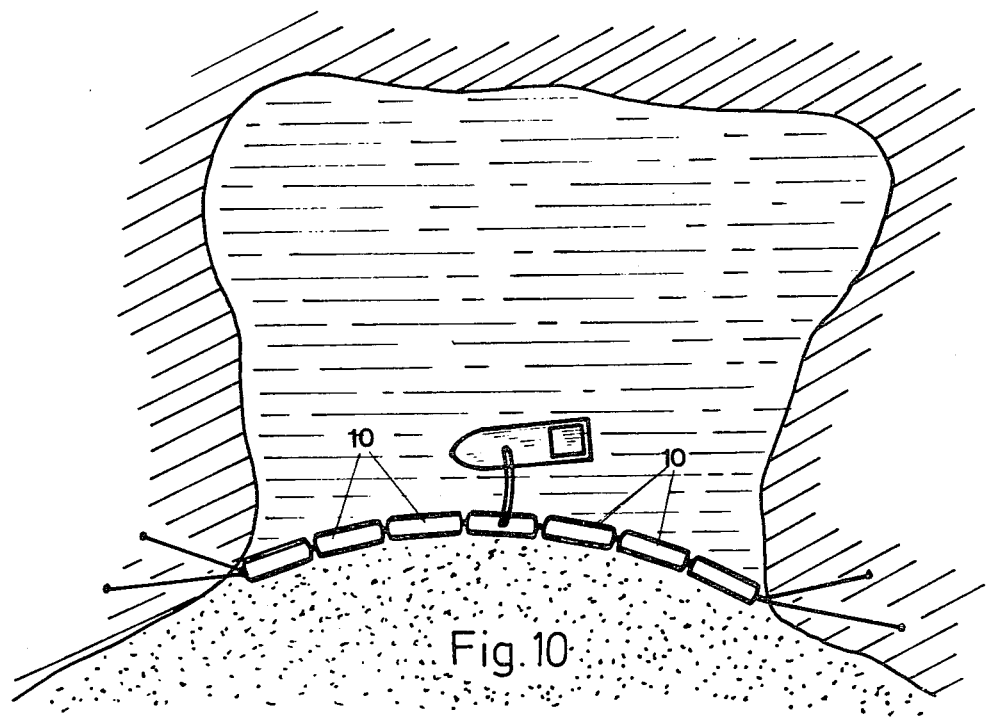
FIG. 10 shows one installation of the device.

The boom illustrated by way of example in the drawings comprises tanks 10 which are made of metal or plastics material, which may be reinforced, and which are interconnected by articulated joints 11 (see FIG. 3) so as to form a chain of tanks.

Each of these tanks 10 has two parallel vertical walls 12 which are interconnected by two curved end walls 13 and by a bottom 14. As illustrated by way of example in the drawings, the tanks 10 have a length about 3 times their width and a depth about twice the width. Over part of the height of the tanks 10 the walling 12 is doubled so as to define buoyancy chambers 15. The upper faces 16 of the tanks are open and three holes 17 are provided in the bottom 14.

When the tanks 10 are placed in the water they fill with water through the holes 17 and float vertically in a perfectly stable manner. The volume of the buoyancy chambers 15 is selected in such a way that the height h projecting above the water surface is approximately one tenth of the total height H.

The boom functions in the following manner:

The waves washing against the tanks pass over the walls 12 and thence, through the open faces 16, into the interior cavities of the tanks 10. The hydrocarbons which are impelled by these waves, and which enter into the tanks progressively expel, through the holes 17, the water contained in the tanks (FIGS. 5 to 8).

This sequence of events is continued until the tanks are completely full of hydrocarbons. The hydrocarbons then begin to exit through the holes 17 (FIG. 8), and have to be cleared from the tanks by pumping them (FIG. 9).

The filling process is based on the two following hydrostatic phenomena:

(1) As water and hydrocarbons are not miscible, and have different densities $d_w$ and $d_h$ (about 1.0 and 0.9 for water and crude oil respectively), they separate into two layers, the hydrocarbons floating on the water, (2) the hydrocarbons washed over into the tanks by the waves assume a higher level than that of the sea, which creates an overpressure at the level of the holes 17, and also causes a certain quantity of water to be expelled through these holes 17 whereby the equilibrium is restored. This phenomenon recurs with each wave washing over the tank.

The condition which has to be satisfied, if the hydrocarbons are to completely fill the tanks, can be expressed as follows:

$$h = \frac{d_w - d_h}{d_w} \times H \simeq \frac{1.0 - 0.9}{1.0} \simeq 1/10$$

If this condition is not satisfied, the hydrocarbon/water interface will stabilise at a certain depth.

The invention is of course not restricted to the subject matter illustrated in the drawing and described above.

In particular, the tanks could be fixed; for example they could be incorporated with port or coastal installations.

Further, each tank may, with advantage, be equipped with a device for indicating the level of the hydrocarbon/water interface and with means for automatically sealing the holes 17 when the tanks are full of hydrocarbon, thereby preventing expulsion of hydrocarbon through the holes 17.

Figure 11:
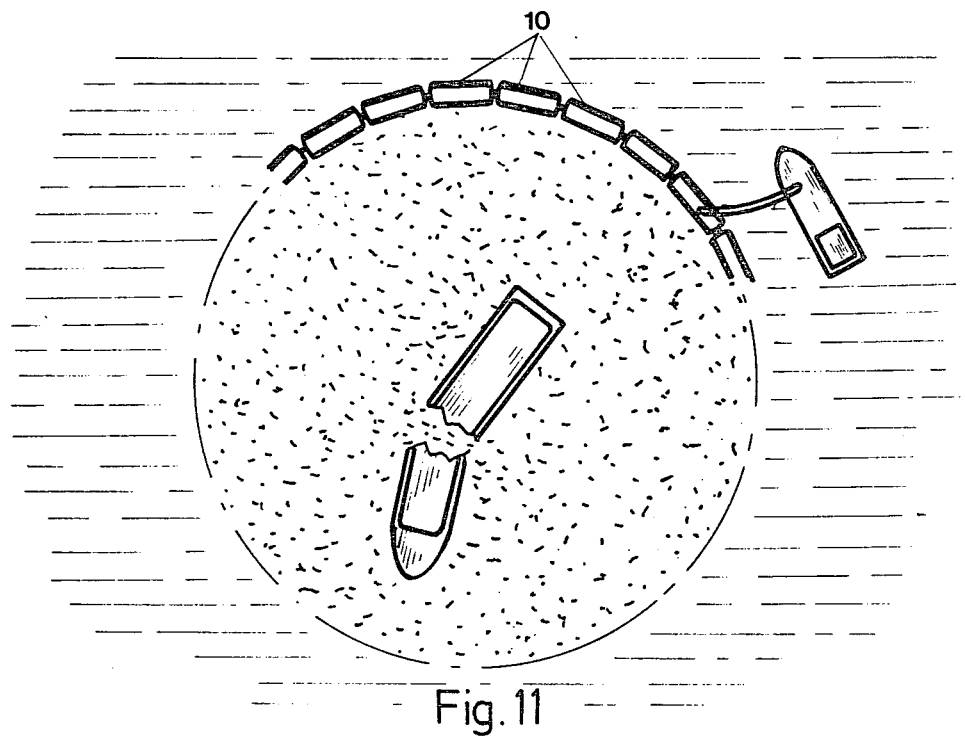
FIG. 11 shows an alternative installation.

The above-described apparatus can be used either for preventing a hydrocarbon slick, arriving from the open sea, from reaching part of the coast (port, beach, harbour, etc.), as illustrated in FIG. 10, or for confining hydrocarbons, which have escaped from an oil tanker which has sustained an accident, to a limited area, as is illustrated in FIG. 11, the maximum quantity of hydrocarbon being recovered in both these instances of practical application.

Further, instead of pumping out the hydrocarbons, the tanks could be discharged, either on the spot or in some other suitable place; this will of course entail the use of means, such as those mentioned above, for sealing off the holes 17, and possibly also the openings 16.

Additionally, means could be provided for establishing communication between several tanks, so that it will then be unnecessary to pump the hydrocarbons tank by tank.

I claim:

1. A boom for collecting oil from the surface of a body of water, the boom comprising a plurality of elongated tanks and means pivotally linking said tanks together end-to-end to form a continuous boom, each tank having longitudinally extending imperforate side walls and end walls, and a bottom defining an oil receiving cavity open at the top, at least one hole in the bottom through which water can enter and leave the cavity, said hole communicating directly with said body of water, and flotation means for supporting the tank in a partially immersed, upright condition in the body of water with upper edges of said walls slightly above the surface of said water, whereby oil lifted by wave action over the upper edges of the walls will be collected in said tanks and displace water from said tanks through said holes in the bottoms of said tanks.

2. A boom as claimed in claim 1, wherein the supporting means support the tanks with approximately nine-tenths of their height immersed.

3. A boom as claimed in claim 1, wherein each of said tanks has straight parallel side walls and convexly curved end walls.

4. A boom as claimed in claim 1, wherein said flotation means comprises internal bouyancy chambers on upper portions of said walls.

5. A boom as claimed in claim 1, in which said tanks are generally rectangular with a length approximately three times their width and a width approximately twice their depth.

6. A boom as claimed in claim 1, in which said flotation means support said tanks in a position in which they are immersed about nine tenths of their height.

* * * * *